UNITED STATES PATENT OFFICE.

LEFFERT R. CORNELL, OF SYRACUSE, NEW YORK.

IMPROVEMENT IN PURIFYING BRINE FOR MANUFACTURE OF SALT.

Specification forming part of Letters Patent No. 121,994, dated December 19, 1871.

*To all whom it may concern:*

Be it known that I, LEFFERT R. CORNELL, of Syracuse, in the county of Onondaga and State of New York, have invented certain new and useful Improvements in Purifying Salt; and I do hereby declare the following to be a full, clear, and exact description thereof, which will enable those skilled in the art to make and use the same.

The brine from salt-wells, which is evaporated for the production of chloride of sodium or common salt, usually contains, in addition, iron, sulphate of lime, and chloride of magnesia, and chloride of calcium, which not only injure the salt for the uses for which it is designed, but also very seriously interfere with and retard the process of evaporation, as the impurities form a deposit upon the evaporating-pan which is difficult to remove, and which, being a bad conductor of heat, retards the process of evaporation. The object of my invention is to remove these impurities from the brine, and thereby not only produce a pure salt, but also avoid the impediment to evaporation already mentioned.

The first part of my invention consists in treating the brine with ammonia, as hereinafter described, by which the acids which hold the earthy and metallic matters in solution in the brine are freed from these bases, thereby causing these bases, or most of them, to precipitate, when the brine can be separated from them. The second part of my invention consists in the addition of caustic lime to the brine, in combination with or after its treatment with ammonia, as hereinafter more fully set forth.

In carrying out my invention I first draw the brine into a tank for its reception, and then to a tank of twenty-five thousand gallons of brine I add eighty-eight pounds of liquid ammonia, which is about one quart of ammonia to one thousand gallons of brine. In introducing the ammonia I plunge it into the brine and stir it thoroughly, so as to incorporate it and completely mix it with the brine. The sulphuric acid and chlorine which are in combination with the earthy matters and the iron combine with the ammonia and pass off with it into the atmosphere, which causes these matters and the iron to precipitate. This operation is, however, hastened by the addition of caustic lime after the ammonia has worked in. I prefer to use about half a bushel of caustic lime to twenty-seven thousand gallons of the brine. The caustic lime acts more particularly on the iron, combining readily with the carbon which it contains, and causing the iron to be perfectly precipitated, the treatment of the brine with ammonia facilitating this operation of the lime. After the brine has been allowed to stand a sufficient time for the impurities to be perfectly deposited it may then be drawn off, and when properly evaporated will produce a pure salt.

The advantages of this improvement are of very great importance. It is well known that salt ordinarily produced from the brine of salt springs is very impure, and that the impurities it contains very greatly injure it and impair its value for the purposes for which it is designed, especially those of preserving butter and meats. To remove these impurities, therefore, and produce a pure chloride of sodium fit for use, and reliable for any purpose where a pure salt is required, might well be regarded as justifying large expense to accomplish so important an object; but in this case, instead of the result being expensive, the cost of manufacture is actually cheapened, because in the boiling down of the impure brine a large portion of these impurities settles upon the evaporating-pan, and, being bad conductors of heat, interfere seriously with the evaporation of the water from the brine, and by removing these impurities I am able to evaporate the water from the brine in much less time and with much less fuel. It is possible that the ammonia might be added in a gaseous form to the brine with similar results; but I prefer the mode I have described as the best.

I claim as my invention—

1. The addition to salt brine of ammonia, substantially as hereinbefore set forth.

2. The addition to the brine of caustic lime after or in combination with the treatment of the brine with ammonia, substantially as hereinbefore set forth.

LEFFERT R. CORNELL.

Witnesses:
 THOS. P. HOW,
 WM. DONNELY.

(129)